United States Patent
Power et al.

(10) Patent No.: US 11,060,527 B2
(45) Date of Patent: Jul. 13, 2021

(54) THRUST RING AND ROTOR FAN SYSTEM WITH PASSIVE LEADING EDGE SLATS

(71) Applicant: Rolls-Royce Corporation, Indianapolis, IN (US)

(72) Inventors: Bronwyn Power, Indianapolis, IN (US); Jonathan M. Rivers, Indianapolis, IN (US)

(73) Assignee: Rolls-Royce Corporation, Indianapolis (IN)

(*) Notice: Subject to any disclaimer, the term of this patent is extended or adjusted under 35 U.S.C. 154(b) by 743 days.

(21) Appl. No.: 15/337,936

(22) Filed: Oct. 28, 2016

(65) Prior Publication Data

US 2018/0119705 A1   May 3, 2018

(51) Int. Cl.
| | |
|---|---|
| *F04D 29/32* | (2006.01) |
| *F02K 3/072* | (2006.01) |
| *F02C 9/58* | (2006.01) |
| *F01D 5/14* | (2006.01) |
| *F02K 3/04* | (2006.01) |

(Continued)

(52) U.S. Cl.
CPC .......... *F04D 29/326* (2013.01); *B64C 11/001* (2013.01); *B64C 11/48* (2013.01); *F01D 5/143* (2013.01); *F01D 5/225* (2013.01); *F02C 9/58* (2013.01); *F02K 3/04* (2013.01); *F02K 3/072* (2013.01); *F04D 19/002* (2013.01); *F04D 29/023* (2013.01); *B64C 2201/162* (2013.01); *B64C 2201/165* (2013.01); *B64D 2027/005* (2013.01); *F05D 2220/323* (2013.01); *F05D 2220/326* (2013.01); *F05D 2220/327* (2013.01); *F05D 2220/36* (2013.01)

(58) Field of Classification Search
CPC ... F04D 29/326; F04D 19/002; B64C 11/001; B64C 11/48; B64C 2201/162; F01D 5/143; F01D 5/225; F01D 1/24; F02C 9/58; F02C 3/067; F02K 3/04; F02K 3/072

See application file for complete search history.

(56) References Cited

U.S. PATENT DOCUMENTS

| | | | | |
|---|---|---|---|---|
| 5,096,382 A | * | 3/1992 | Gratzer | B63H 1/16 |
| | | | | 416/189 |
| 6,598,834 B2 | * | 7/2003 | Nettle | B64C 3/48 |
| | | | | 244/215 |
| 8,418,966 B2 | * | 4/2013 | Hetrick | B64C 3/48 |
| | | | | 244/214 |

FOREIGN PATENT DOCUMENTS

| | | |
|---|---|---|
| EP | 2799334 A1 | 11/2014 |
| FR | 3030445 A1 | 6/2016 |

OTHER PUBLICATIONS

Extended European Search Report dated Mar. 19, 2018, for European Patent Application No. 17194522.3, Applicant, Rolls-Royce Corporation, (9 pages).

(Continued)

*Primary Examiner* — David E Sosnowski
*Assistant Examiner* — Sabbir Hasan
(74) *Attorney, Agent, or Firm* — Brinks Gilson & Lione

(57) ABSTRACT

A fan system includes a rotor having plurality of blades and a ring airfoil, the plurality of blades being rotatably joined to a hub and the ring airfoil. The fan system may include a second contra-rotationally disposed rotor having a plurality of blades and a ring airfoil. The first and second ring airfoils having a cambered shape and an angle of attack between about −5 degrees and about 45 degrees. Passive leading edge slats are attached to the ring airfoil and are configured to open and close using springs.

16 Claims, 6 Drawing Sheets

(51) Int. Cl.
*F01D 5/22* (2006.01)
*B64C 11/00* (2006.01)
*B64C 11/48* (2006.01)
*F04D 19/00* (2006.01)
*F04D 29/02* (2006.01)
*B64D 27/00* (2006.01)

(56) References Cited

OTHER PUBLICATIONS

Extended European Search Report dated Mar. 20, 2018, for European Patent Application No. 17196349.9, Applicant, Rolls-Royce Corporation, (8 pages).

* cited by examiner

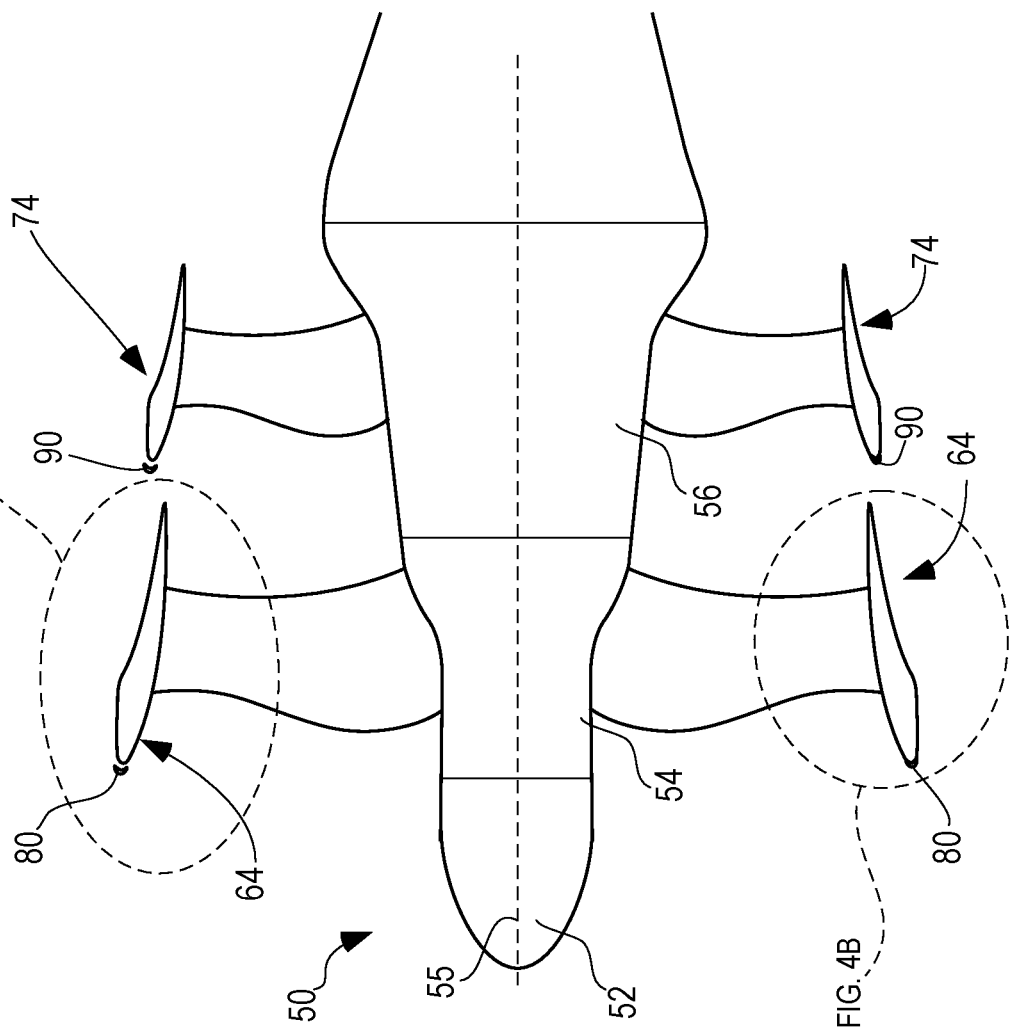

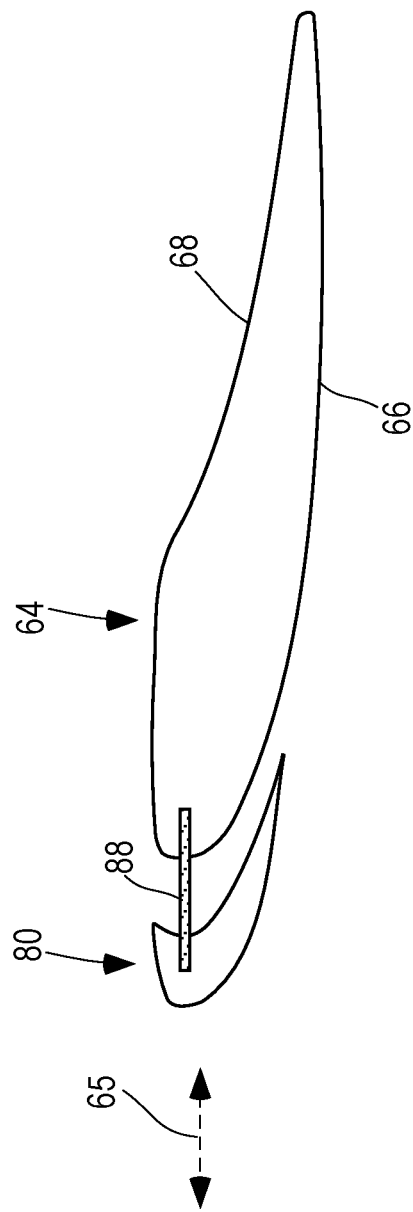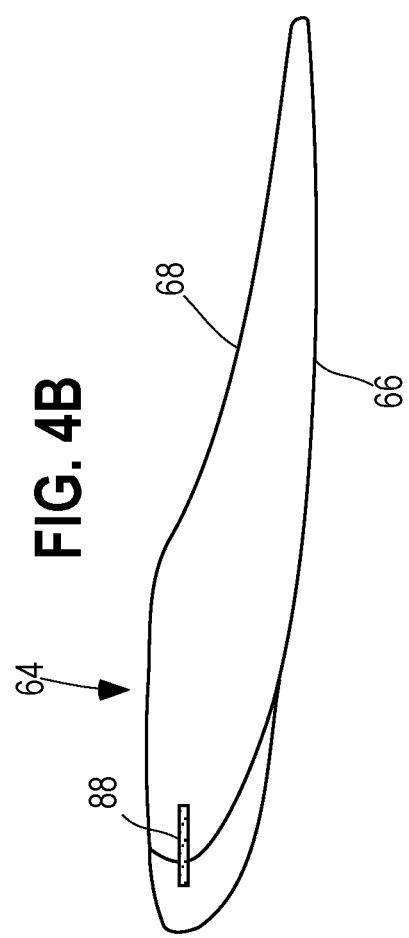

THRUST RING AND ROTOR FAN SYSTEM WITH PASSIVE LEADING EDGE SLATS

FIELD OF DISCLOSURE

The present disclosure generally relates to fan systems for gas turbine engines. More particularly, but not exclusively, the present disclosure relates to configurations and orientations of fan blades attached to one or more rotors having a ring airfoil.

BACKGROUND

Providing engine equipment to operate at a high propulsive efficiency, with minimal drag, and having minimal weight, remains an area of interest. Some fan blade systems employ various geometries that redirect airflow or redistribute weight to increase efficiency. Specifically, fan blade systems may include various blade shapes with and without nacelles. Overall, existing systems have various shortcomings relative to certain applications. Accordingly, there remains a need for further contributions in this area of technology.

SUMMARY

According to one aspect, a fan system has a rotor that is rotatable about an axis. A plurality of blades are attached to the rotor, and a ring airfoil is attached to each of the plurality of blades. The ring airfoil has a cambered cross section, the ring airfoil forms an angle of attack relative to the axis, and one or more slats are disposed along the leading edge of the ring airfoil.

According to another aspect, a fan system has a first rotor. The first rotor has a first plurality of blades that extend outwardly from a first hub. A first ring airfoil is attached to each of the first plurality of blades, and a second rotor has a second plurality of blades attached to a second hub. A second ring airfoil is attached to each of the second plurality of blades, the first rotor and the second rotor are contra-rotationally disposed on a shaft, and one or more slats are disposed on a leading edge of the first ring airfoil.

According to another aspect, a method for operating a fan system includes providing a rotor with a plurality of blades joined by a ring airfoil. The ring airfoil has a camber and one or more slats disposed on a leading edge. The first rotor rotates about a central axis, and the blades generate thrust, the ring airfoil generates thrust, and the one or more slats close under a load.

Other aspects and advantages will become apparent upon consideration of the following detailed description and the attached drawings wherein like numerals designate like structures throughout the specification.

BRIEF DESCRIPTION OF THE DRAWINGS

FIG. 4 depicts a side sectional view of an embodiment of the fan system.

FIG. 4A shows leading edge slats in a deployed position.

FIG. 4B shows leading edge slats in a closed position.

DETAILED DESCRIPTION

Figure 1:
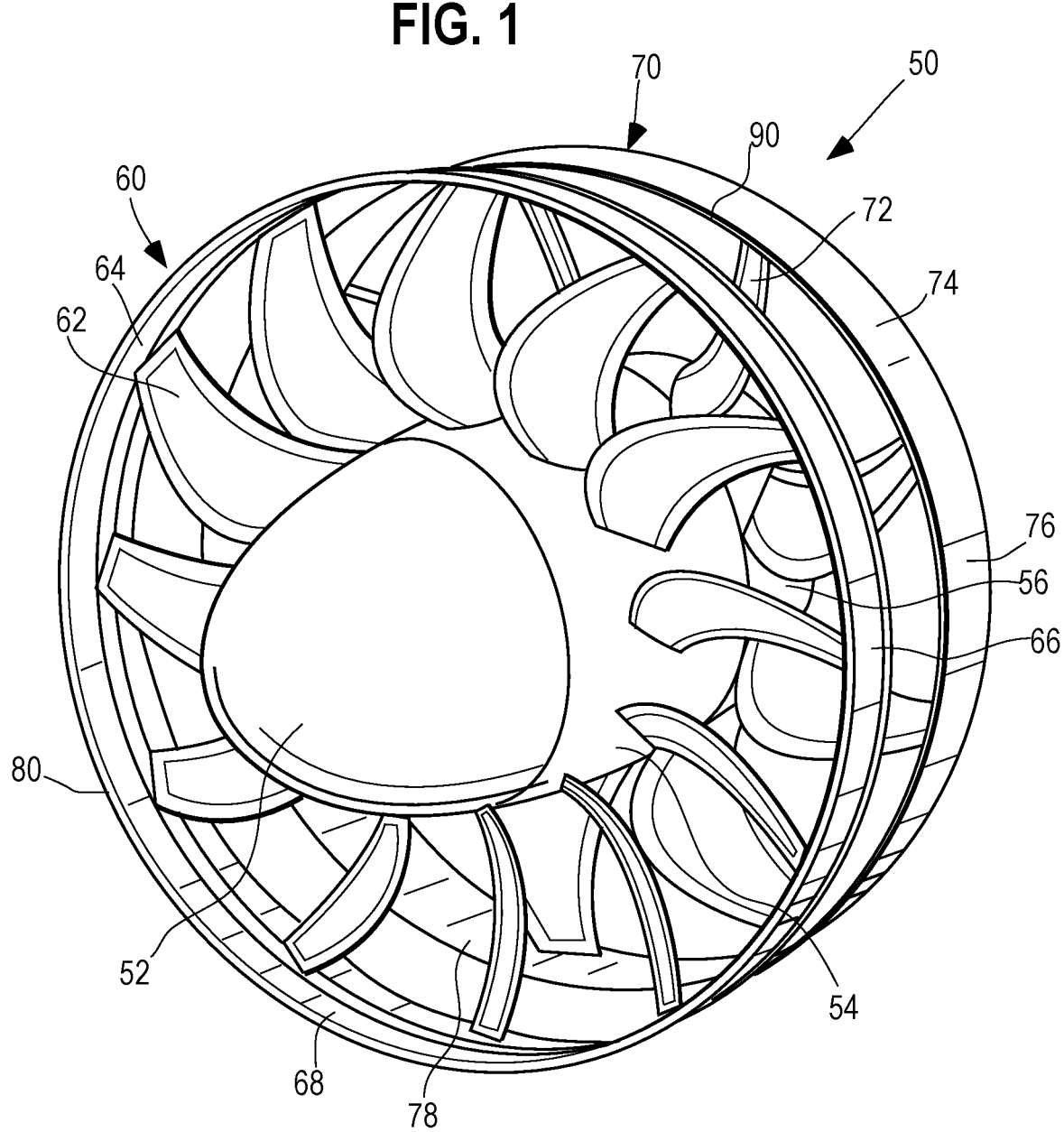
FIG. 1 depicts an isometric view of an embodiment of a fan system including two rotors, each rotor comprising a ring airfoil and a plurality of fan blades attached to a hub.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Fan systems have numerous performance requirements to consider including: fuel efficiency, component strength, useful life, fan bade off containment (which may entail debris of various size and energy), noise emission, and power output. Fan systems include a fan comprising a plurality of fan blades mounted on a hub that rotate about an axis.

The thrust ring and rotor fan system is a new form of aircraft propulsion system intended for civil and military aircraft operating at high-subsonic cruise Mach numbers and for both long and short-distance mission profiles. The ring airfoil (thrust ring) is cambered, meaning that the chord line and the camber line of the ring airfoil are not the same.

Referring to FIG. 1, an embodiment of the thrust ring and rotor fan system 50 having passive leading edge slats 80, 90 is shown. The fan system 50 has two rotor sets. The front rotor 60 and the rear rotor 70 operate in a contra-rotating manner (the rotors spin in opposite directions) similar to that of an open-rotor system. The leading edge slat 80 is disposed on the front ring airfoil 64. The front ring airfoil 64 is joined to the front hub 54 by a series of front blades 62 that extend radially from the front hub 54 and are rotatable. The front hub 54 is mounted rearward of the nose 52 and forward of the rear hub 56 and rotates around an axis. The front ring airfoil 64 further includes a front outboard surface 66 and a front inboard surface 68. The contra-rotating rotor sets can form the primary low-pressure compression phase of a pusher, puller or mid-located engine configuration.

The rear rotor 70 includes a ring airfoil 74 having a rear outboard surface 76 and a rear inboard surface 78. A rear leading edge slat 90 is disposed on the rear ring airfoil 74. The rear ring airfoil is 74 joined to the rear hub 56 by a series of rear blades 72 that extend radially from the rear hub 56 and are rotatable. The rotors may preferably be geared to achieve the low rotor tip-speeds intended for maximum propulsive efficiency and minimum noise emission.

In a further embodiment, passive leading edge slats are disposed on a thrust ring and rotor fan system having a single rotor. Further, the present disclosure contemplates use in other applications that may not be aircraft related such as industrial fan applications, power generation, pumping sets, naval propulsion, weapon systems, security systems, perimeter defense/security systems, and the like known to one of ordinary skill in the art.

The thrust ring structure is also disclosed in U.S. patent application Ser. No. 15/338,035 filed on Oct. 28, 2016 entitled THRUST RING AND ROTOR FAN SYSTEM and is also assigned to the same assignee as the present application which is hereby incorporated by reference in its entirety as if set forth fully herein.

Figure 2:
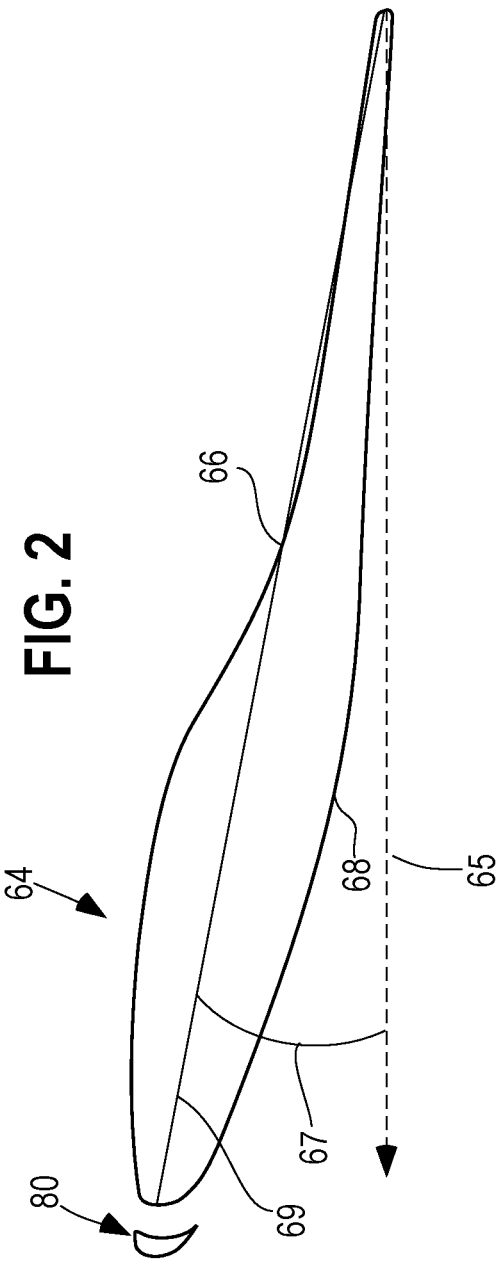
FIG. 2 depicts a cross sectional view of the ring airfoil having a leading edge slat.

Referring to FIG. 2, a side sectional exploded view of an embodiment of the fan system 50 includes a ring airfoil 64 having a leading edge slat 80 separated from the ring airfoil 64 (spring not shown). The slat 80 is shaped so that it conforms to the leading edge of the ring airfoil 64 when in the closed position. The ring airfoil 64 has an outboard side 66 (pressure side) and an inboard side 68 (suction side). The slat may be a single structure that runs the entire circumference of the ring airfoil. Optionally, one or more slats may be disposed in sections along the leading edge of the ring airfoil. In one embodiment, six slat sections are disposed on the leading edge of the ring airfoil.

The leading edge slats may selectively be constructed of a titanium alloy. Alternatively, other alloys may be used so that the leading edge slat is able to withstand impacts from birds or other airborne debris.

The ring airfoil 64 of the front rotor 60 is disposed at an angle of attack 67 which is defined by the front chord line 69 of the ring airfoil 64 relative to the axial direction 65. The axial direction 65 is parallel to the axis of rotation (not shown) of the fan system 50. In the illustrated embodiment, the angle of attack 67 is approximately 10 degrees. Preferably, the angle of attack is between −5 degrees and about 45 degrees. More preferably the angle of attack is between 5 degrees and about 30 degrees. In the illustrated embodiment, the rear ring airfoil 74 has a similar angle of attack 77 defined by the rear chord line 79 and the axial direction 65.

Figure 3:
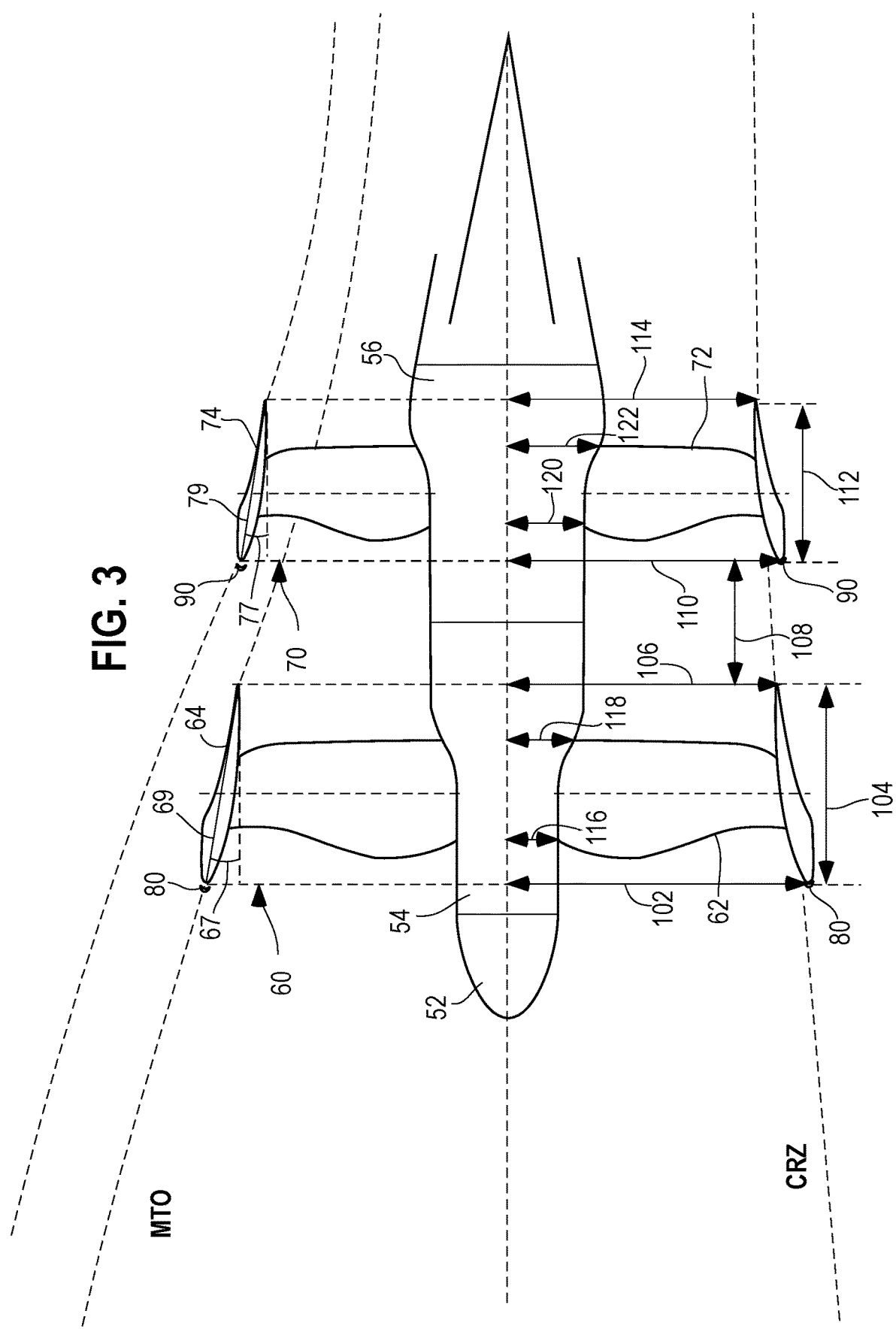
FIG. 3 depicts a cross sectional view of a fan system having leading edge slats having different stream tubes at different operating regions.

Referring to FIG. 3, the fan system 50 is in relation to stream tubes at take-off (MTO) and at cruise (CRZ). At take-off, the stream tubes of air acting on the front ring airfoil 64 and the rear ring airfoil 74 are substantially wider than the stream tubes acting on the front ring airfoil 64 and the rear ring airfoil 74 during cruise. The narrow, cruise stream tube causes pressure on the leading edge slats along the axial direction 65 that is parallel to the axis of rotation 55 of the fan system. The slats are configured so that the pressure at cruising speeds causes the slats 80, 90 to close.

In the illustrated embodiment, the leading edge radius 102 of the front ring airfoil 64 is greater than the leading edge radius 110 of the rear ring airfoil 74. Both the front ring airfoil 64 and the rear ring airfoil 74 are shown having angles of attack 67, 77. As such, the leading edge radius 102 of the front airfoil 64 is greater than the trailing edge radius 106 of the front ring airfoil 64. Likewise, the leading edge radius 110 of the rear airfoil 74 is greater than the trialing edge radius 114 of the rear ring airfoil 74. FIG. 3 shows the angles of attack 67, 77 with reference to the axial direction 65 (shown in dashed lines that are parallel to the axis 55 of rotation of the fan system 50).

The axial length 104 of the front ring airfoil 64 is less than the leading edge radius 102 of the front ring airfoil 64. Similarly, the axial length 112 of the rear ring airfoil 74 is less than the leading edge radius 110 of the rear ring airfoil 74. The gap 108 between the front ring airfoil 64 and the rear ring airfoil 74 is less than the axial length 104 of the front ring airfoil 64.

The nose 52 is mounted forward of the front hub 54 and the rear hub 56. As the front hub 54 and rear hub 56 extend rearward, the radii of each may increase. In the illustrated embodiment, the hub radius 116 at the leading edge of the front blades 62 is less than the hub radius 118 at the trailing edge of the front blades 62. Similarly the hub radius 120 at the leading edge of the rear blades 72 is less than the hub radius 122 at the trailing edge of the rear blades 72.

Referring to FIG. 4, FIG. 4A, and FIG. 4B, the one or more slats 80 are configured to move in the axial direction (horizontally). When under no load, the spring 88 is relaxed and the slat 80 is in an open position (FIG. 4A). At cruising speed, the ring airfoil 64 and the slat 80 experience a high pressure on the leading edge and as a result, the slat 80 moves from an opened position to a closed position (FIG. 4B). The spring 88 allows the slats 80 to operate passively. When the slats are open, they effectively elongate the outboard surface 66 (pressure side) and the inboard side 68 (suction side) of the ring airfoil 64. They are open when needed (during take-off) and they close via dynamic pressure when they are not needed (during cruise) at high speeds or when the stream tube of air acting on the leading edge slats is in the axial direction 65 (parallel to the axis 55 of rotation).

Further, other structures could be employed to operate the slats. Pistons, rails, hydraulic systems, or other structures combined with springs could be used to actuate the passive leading edge slats.

Figure 5:
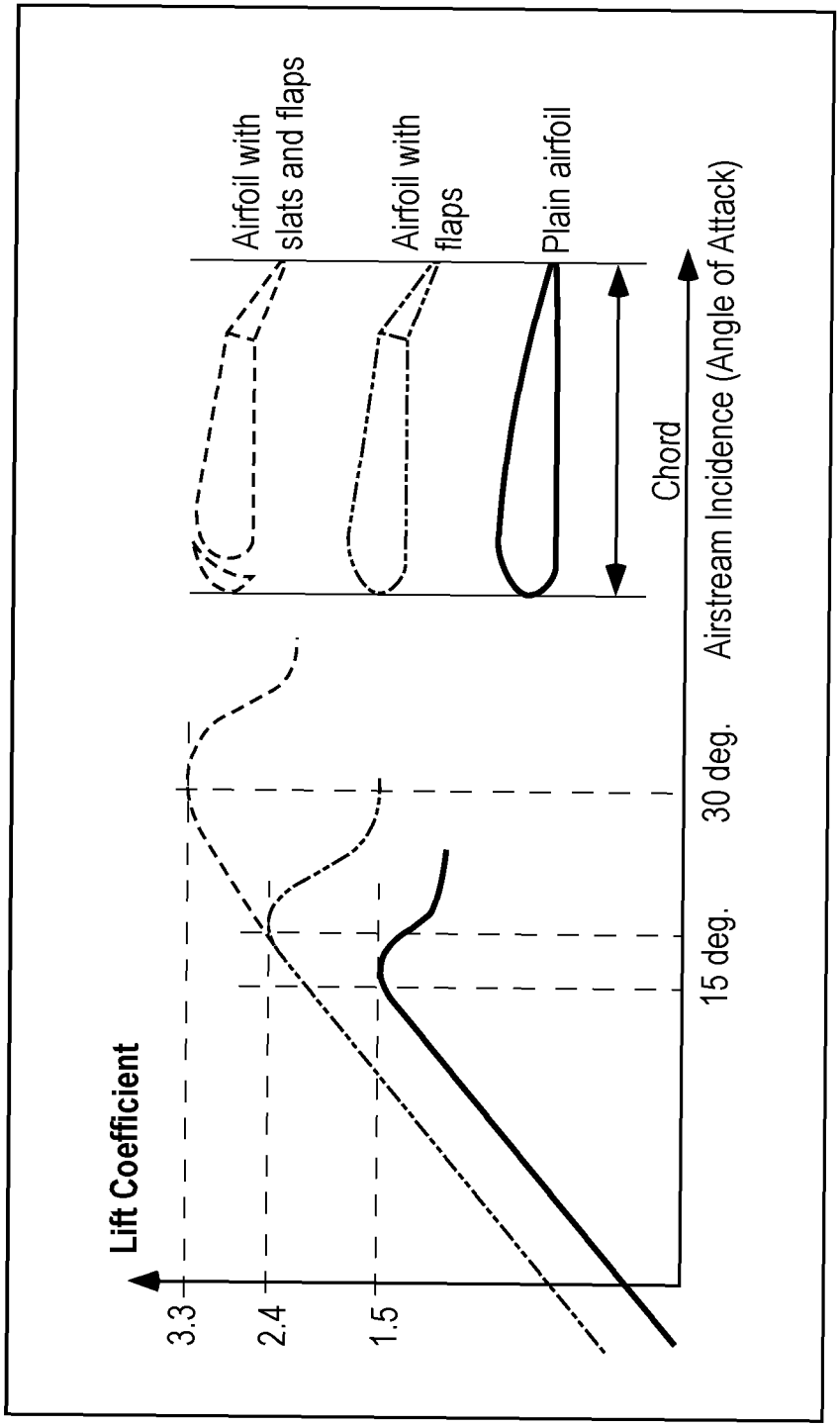
FIG. 5 depicts a graph showing the effect of slats and flaps on lift coefficient as the angle of attack is varied.

Referring to FIG. 5, a leading edge slat increases the lift coefficient of the ring airfoil 64. Further one or more leading edge slats allow the ring airfoil 64 to handle a larger incidence range (angle of attack)—up to about 30 degrees.

In a further embodiment, the leading edge slat is sectioned into multiple leading edge slats along the circumference of the ring airfoil.

The embodiment(s) detailed above may be combined, in full or in part, with any alternative embodiment(s) described.

INDUSTRIAL APPLICABILITY

Important advantages of a fan system comprising a plurality of blades joined by a ring airfoil having one or more leading edge slats includes increased propulsive efficiency, reduction in the weight of the blade (when compared to the size a ring airfoil would need to be to achieve the same propulsive result), and increased life of the fan blade system.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Various embodiments of this disclosure are described herein, including the best mode known to the inventors for carrying out the disclosure. It should be understood that the illustrated embodiments are exemplary only, and should not be taken as limiting the scope of the disclosure.

We claim:

1. A fan system, comprising:
   a rotor, the rotor being rotatable about an axis, the axis defining an axial direction;
   a plurality of blades attached to the rotor; and
   a ring airfoil, the ring airfoil attached to each of the plurality of blades;

wherein the ring airfoil has a cambered cross section, wherein the ring airfoil forms an angle of attack relative to the axial direction, wherein one or more slats are disposed along a leading edge of the ring airfoil, and wherein the one or more slats are joined to the leading edge of the ring airfoil by a plurality of springs and configured to close passively by a translational motion along the axial direction without undergoing a rotational motion when confronted by a cruise stream tube causing pressure in the axial direction.

2. The fan system of claim 1, wherein the angle of attack is between −5 degrees and 45 degrees.

3. The fan system of claim 2, wherein the angle of attack is between 5 and 30 degrees.

4. The fan system of claim 3, wherein the one or more slats are configured to be in an extended position when the fan system is not running.

5. The fan system of claim 4, wherein the one or more slats are configured to close passively during cruise.

6. The fan system of claim 4, wherein the one or more slats are constructed of Ti-6Al-4V alloy.

7. The fan system of claim 4, wherein the one or more slats are arranged in six sections around the ring airfoil.

8. A fan system, comprising:
a first rotor, the first rotor being rotatable about an axis, the axis defining an axial direction;
the first rotor having a first plurality of blades extending outwardly from a first hub;
a first ring airfoil, the first ring airfoil attached to each of the first plurality of blades;
a second rotor, the second rotor having a second plurality of blades attached to a second hub; and
a second ring airfoil, the second ring airfoil attached to each of the second plurality of blades;
wherein the first rotor and the second rotor are contra-rotationally disposed on a shaft, wherein one or more slats are disposed on a leading edge of the first ring airfoil, wherein each of the one or more slats are joined to the leading edge of the first ring airfoil by a plurality of springs, wherein an axial length of the first ring airfoil is less than a radius of the leading edge of the first ring airfoil, and wherein the one or more slats are configured to close passively by a translational motion along the axial direction during cruise without undergoing a rotational motion when confronted by a cruise stream tube causing pressure in the axial direction.

9. The fan system of claim 8, wherein each of the first ring airfoil and the second ring airfoil has a cambered cross section.

10. The fan system of claim 9, further comprising a further one or more slats disposed on a leading edge of the second ring airfoil.

11. The fan system of claim 10, wherein there is a gap between the first ring airfoil and the second ring airfoil.

12. The fan system of claim 11, wherein the one or more slats of the first ring airfoil are constructed of Ti-6Al-4V alloy.

13. The fan system of claim 11, wherein an angle of attack is defined by a chord line of the first ring airfoil and the axial direction, wherein the angle of attack is between −5 degrees and 45 degrees.

14. The fan system of claim 13, wherein the angle of attack is between 5 degrees and 30 degrees.

15. A method for operating a fan system, the method comprising:
providing a first rotor comprising a first plurality of blades joined by a first ring airfoil, wherein the first ring airfoil has a cambered cross section and one or more slats disposed on a leading edge, and wherein each of the one or more slats are joined to the leading edge of the first ring airfoil by a plurality of springs;
rotating the first rotor about a central axis in a first direction, the central axis defining an axial direction; and
rotating the first plurality of blades whereby the first plurality of blades generate thrust wherein the first ring airfoil is configured to generate thrust and the one or more slats are configured to close passively by a translational motion along the axial direction during cruise without undergoing a rotational motion when confronted by a cruise stream tube causing pressure in the axial direction.

16. The method of claim 15, further comprising:
providing a second rotor comprising a second plurality of blades joined by a second ring airfoil; and
rotating the second rotor about the central axis in a direction opposite the first direction.

* * * * *